April 1, 1969  R. H. E. GREBERT  3,436,130

BALL-TYPE TRANSMISSION APPARATUS

Filed Oct. 11, 1966

United States Patent Office 3,436,130
Patented Apr. 1, 1969

3,436,130
BALL-TYPE TRANSMISSION APPARATUS
Roger Henri Ernest Grebert, Paris, France, assignor to Societe Industrielle de Mecanique et de Materiel d'Equipment, Suresnes, Hauts-de-Seine, France
Filed Oct. 11, 1966, Ser. No. 585,968
Claims priority, application France, June 23, 1966, 66,728
Int. Cl. F16c *19/02, 33/44*
U.S. Cl. 308—6      4 Claims

ABSTRACT OF THE DISCLOSURE

A ball-type transmission apparatus in which a flexible strip slides between two rows of balls enclosed in a flexible sheath, each row of balls being retained in a ball cage which comprises a flexible band having holes in which the balls are positioned. The bands are prevented from contacting the central strip or the sheath and friction between the bands and the balls is reduced by eyelets which are placed within the holes and which project in a direction perpendicular to the bands.

---

The invention relates to ball-type transmissions in which a flexible strip slides between two rows of balls enclosed in a flexible sheath provided with two ball-race rails.

For good operation of such a transmission apparatus the balls of each row are held by a ball cage formed of a flexible metallic band having openings for each ball. These openings possess raised edges on either side of the ball in order to prevent the latter from escaping from the cage thus formed and jamming the transmission.

However, as represented in FIGURES 1 and 2, in the curves of the transmission the cage tends to come into contact, in the course of operation, with either the flexible strip or the rail, which rapidly causes its displacement towards one end and considerably increases the effort for obtaining the total stroke of the strip.

Moreover the raised edges of the ball cages often possess wire-edges which rub upon the strip and the rails and constitute significant passive resistances, and furthermore in line with the openings these ball cages are very fragile and possess lower strength at this point, which causes them to curve in at these points and even to break at the end of numerous manipulations of the transmission apparatus.

It is the purpose of the invention to remedy these drawbacks.

Thus the invention has for object a ball-type transmission apparatus of the above-mentioned type, which is noteworthy in that the balls of each row are held by a ball cage formed from a flexible metallic band comprising holes each provided with an eyelet forming a cage for each ball.

Other supplementary characteristics of the invention will appear from the detailed description given below with reference to the accompanying drawing. The description and the drawing are of course given only by way of indication and are not limitative.

Figure 1:
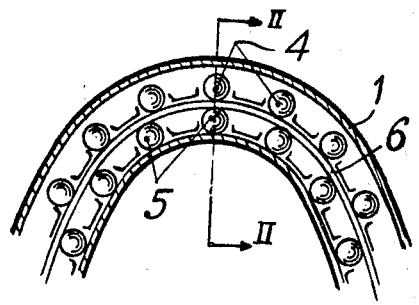
FIGURE 1 is a longitudinal section of a known ball-type transmission.
Figure 2:
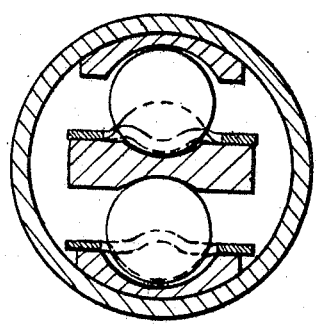
FIGURE 2 is a section, on a larger scale, along the line II—II in FIGURE 1.
Figure 3:
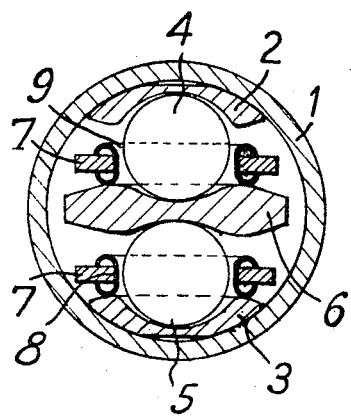
FIGURE 3 is a section analogous with that in FIGURE 2, of a ball-type transmission according to the invention.

The ball-type transmission according to the invention, represented in FIGURE 3, comprises a sheath 1 within which there are disposed two ball-race rails 2 and 3 for two rows of balls 4 and 5 which roll on a flexible, movable strip 6 serving for the transmission of the motion.

So that the balls may preserve a constant spacing, which is necessary for good functioning of the transmission, they are held in a ball cage formed from a flexible metallic band 7 pierced at regular intervals with holes 8 equipped each with eyelet 9 of diameter slightly greater than that of the balls placed therein.

This eyelet 9, for example of stainless steel, which has a thickness substantially equal to the radius of the ball, reinforces the cage 7 in line with the opening 8 and moreover prevents the cage 7 from rubbing on one of the rails 3 or 4 or on the transmission strip 6, thus significantly diminishing the friction, which is localised solely between the eyelets 9 and the rails or strip 6, for which receding-edge shapes are utilised so as to limit the rubbing area of the eyelets to a longitudinal ridge.

As friction is considerably diminished, the ball cages no longer have a tendency, or have much less tendency, to slip towards the extremity, and the take-up of total stroke in all cases can be effected without abnormal effort, the danger of deterioration of these cages and blockage of the control thus being removed.

The invention is not limited to the single form of embodiment as described and represented, but on the contrary covers all variants thereof.

I claim:

1. A ball-type transmission apparatus in which a flexible central strip slides between two rows of balls enclosed in a flexible sheath, two ball cages, each cage retaining the balls of one row, each cage being formed by a flexible band of a height less than the diameters of said balls and having holes spaced along the length thereof, and an eyelet within each hole, each of said eyelets shielding the edges of its associated hole and projecting beyond its associated band in a direction perpendicular thereto to limit the travel of the band between said strip and said sheath when said strip is passing through a curved portion of said sheath.

2. A transmission apparatus according to claim 1, wherein the eyelet has an internal diameter greater than the diameter of the ball and its thickness is substantially equal to the radius of the ball.

3. A transmission apparatus according to claim 1 wherein said sheath has rails upon which said rows of balls roll, the rails and the transmission strip have receding edge forms to limit the rubbing area of the eyelets to a ridge.

4. A transmission apparatus according to claim 1 wherein said eyelets project both toward said strip and said sheath to prevent said band from engaging against either of said strip or said sheath.

References Cited

UNITED STATES PATENTS

| Re. 24,982 | 5/1961 | Schiring | 308—613 |
| 1,479,086 | 1/1924 | Parsons | 308—201 |
| 2,372,204 | 3/1945 | Herkert | 74—501 |
| 2,841,029 | 7/1958 | Richoux | 74—501 |
| 3,287,990 | 11/1966 | Ellinger | 74—501 |
| 3,362,249 | 1/1968 | Richoux | 74—501 |

FOREIGN PATENTS

| 536,781 | 2/1957 | Canada. |
| 864,338 | 1/1953 | Germany. |

EDGAR W. GEOGHEGAN, *Primary Examiner.*

L. L. JOHNSON, *Assistant Examiner.*

U.S. Cl. X.R.

74—501